United States Patent [19]

Parekh et al.

[11] Patent Number: 5,361,941
[45] Date of Patent: Nov. 8, 1994

[54] CHILLED PRODUCT DISPENSING SYSTEM

[75] Inventors: Shafi Parekh, Irving; Bernard M. Geiger, Dallas; Reginald Fowler, Garland, all of Tex.

[73] Assignee: Froezert USA Inc., Dallas, Tex.

[21] Appl. No.: 856,623

[22] Filed: Mar. 24, 1992

[51] Int. Cl.$^5$ ............................................. B65D 35/28
[52] U.S. Cl. ..................................... 222/95; 222/105;
222/146.6; 222/386.5; 222/389
[58] Field of Search .................... 222/95–96,
222/105, 146.6, 386.5, 325, 326, 389, 160, 162,
387, 183, 1; 82/393–396

[56] References Cited

U.S. PATENT DOCUMENTS

| | | | |
|---|---|---|---|
| 3,435,990 | 4/1969 | Pike, Jr. .......................... | 62/394 |
| 3,461,684 | 8/1969 | Simpson ......................... | 62/394 |
| 3,475,922 | 11/1969 | Scott et al. ..................... | 62/394 |
| 5,048,724 | 9/1991 | Thomas ........................... | 222/105 |
| 5,150,820 | 9/1992 | McGill ............................. | 222/146.6 |
| 5,265,764 | 11/1993 | Rowe et al. ..................... | 222/146.6 |

*Primary Examiner*—Andres Kashnikow
*Assistant Examiner*—Philippe Derykshani

[57] ABSTRACT

A method and apparatus for maintaining and dispensing chilled or frozen products including a plurality of dispensing apparati each within a chilled chamber and each having a valve outlet through which the chilled or frozen product is dispensed. In another aspect the chilled or soft frozen product dispensing apparatus utilizes gas pressure extrusion of the chilled or soft frozen products wherein the chilled or soft frozen product passes along a heat extrusion head projection as it is extruded which results in a dispensing of uniformly chilled flowable food products.

11 Claims, 2 Drawing Sheets

CHILLED PRODUCT DISPENSING SYSTEM

FIELD OF THE INVENTION

This invention relates to an apparatus and method for maintaining and dispensing chilled or soft frozen products. More particularly this invention is concerned with a chilled product dispensing system inclusive of a plurality of dispensing apparati, each within a chilled barrel chamber and each having a valve outlet through which the chilled or frozen product is dispensed. In another aspect the chilled or soft frozen product dispensing apparatus utilizes gas pressure extrusion of the chilled or soft frozen products wherein the chilled or soft frozen product passes along a heat sink extrusion head projection as it is extruded which results in a dispensing of uniformly chilled flowable food products.

BACKGROUND OF THE INVENTION

In the past, refrigerated mixing and dispensing machines were bulky due to the fact that the drive train for the machine was offset from the drive shaft of the motor. These drive trains usually utilize belt drives which result in power loss, slippage and inefficient use of space. In addition many prior refrigerated mixing and dispensing machines have the food product fed to a dasher assembly with erratic performance and dispensing. When equipped with a pump, existing refrigerated mixing and dispensing machines are frequently difficult to dissemble and clean.

Another existing problem for prior refrigerator mixing and dispensing machines is the inability of the dasher blade assembly to keep the mix from freezing on the interior wall of the freezing cylinder thereby causing inefficient heat transfer. Most of these machines have fixed blades that maintain a constant pressure and present wear problems. Other approaches have been to create a motor-gear driven system which avoid shaft and clutch assemblies thus affording elimination of problems associated with offset belt drives such as power loss, slippage and inefficient use of space. All of these mechanical approaches are subject to wear and generally do not present a simple to remove apparatus for inspection and cleaning.

Independent of the dispensing mixing refrigerated machines, the dispensing of soft frozen food products frequently results in nonuniformity of viscosity of the dispensed product. The dispensing apparatus of the prior art fails to dispense uniformly chilled flowable food product, for example, when the product valve is initially opened, the first dispensed product is of a warmer temperature than the remainder of the product, producing a melted product which is not desirable. Substantial food product waste is created by these dispensing apparatus since the initial dispensing food product must be caught separately and discarded due to the nonuniformity of temperature and viscosity.

Flowable food dispensing problems relating to thermodynamics have also been encountered by confectionery dispensers as well wherein the viscosity or flowability of the produce is dependent upon the temperature. Chilled confectionery dispensers operate under conditions very close to safety limits of solidification temperatures. Various attempts have been made in resolving these problems, for example, through the use of nozzle assemblies with the nozzle assembly being insulated from surrounding components and having portions which are heat controllable in order to accommodate the sensitive thermal limitations in confectionery dispensing.

Similarly, dispensing of uniform viscosity chilled food products requires careful control of the thermodynamics of the apparatus. The key for dispensing uniformly chilled flowable food products utilizing a dispensing assembly of a simple design has resulted in the present invention wherein the principle object is to provide a new apparatus for cooling and dispensing uniformly chilled flowable food products through a dispensing tube extrusion head past a heat sink extrusion head projection for release of the uniformly chilled product. The apparatus utilizes simple chilled gas pressure as a driving force for extrusion thus eliminating the need or the problems associated with pumps, gear drive motors, shafts, clutch assemblies and the like.

BRIEF SUMMARY OF THE INVENTION

According to the invention, there is provided an apparatus and method for dispensing a chilled or soft frozen product at a uniform temperature. The chilled food product dispensing system dispenses a flowable food media such as a liquid, semi-liquid, or a liquid containing particulate matter in preselected quantities and at preselected temperatures, using an apparatus which includes storing means for storing the flowable media to be dispensed. The dispensing means for dispensing the flowable food product from such storing means is achieved through an extrusion head and dispensing passageway wherein the components provide a heat sink for maintaining uniform temperature of the dispensing zone and the flowable food product. A cylindrical cold chamber product storage region, containing a barrel elongated tubular container, is provided for chilling the food product to near its freezing temperature. The food product is confined within a flexible bag open at one end to the dispensing extrusion head which communicates with a passageway header for the dispensing products. The flexible bag is contained within the barrel elongated tubular container. The apparatus is driven by a pressurized gas source valved into a first end of the barrel elongated tubular container with a second end being in communication with a dispensing tube extruder head. The barrel elongated tubular container dispensing tube, extrusion head and projection are constructed of thermal conductive materials thereby creating a heat sink. The dispensing tube is inserted into the chilled food product through the open end of the flexible bag. Upon exertion of gas pressure against the closed end of the flexible bag, food product is forced through the extrusion head into the passageway header and past the valve means for dispensing. Operation of the dispensing push button not only opens the valve gate for dispensing uniformly chilled flowable food product, but also activates the gas pressure which flows into the barrel elongated tubular container through activation of gas valving means; thus providing a drive means for dispensing without use of motors, gears or related mechanical systems.

These and other features and advantages of the invention will be made apparent from the following detailed descriptions which refer to the accompanying drawings.

DESCRIPTION OF THE DRAWINGS

The invention is described in greater in the accompanying drawings. These drawings show the following.

DETAILED DESCRIPTION OF THE INVENTION

Figure 1:
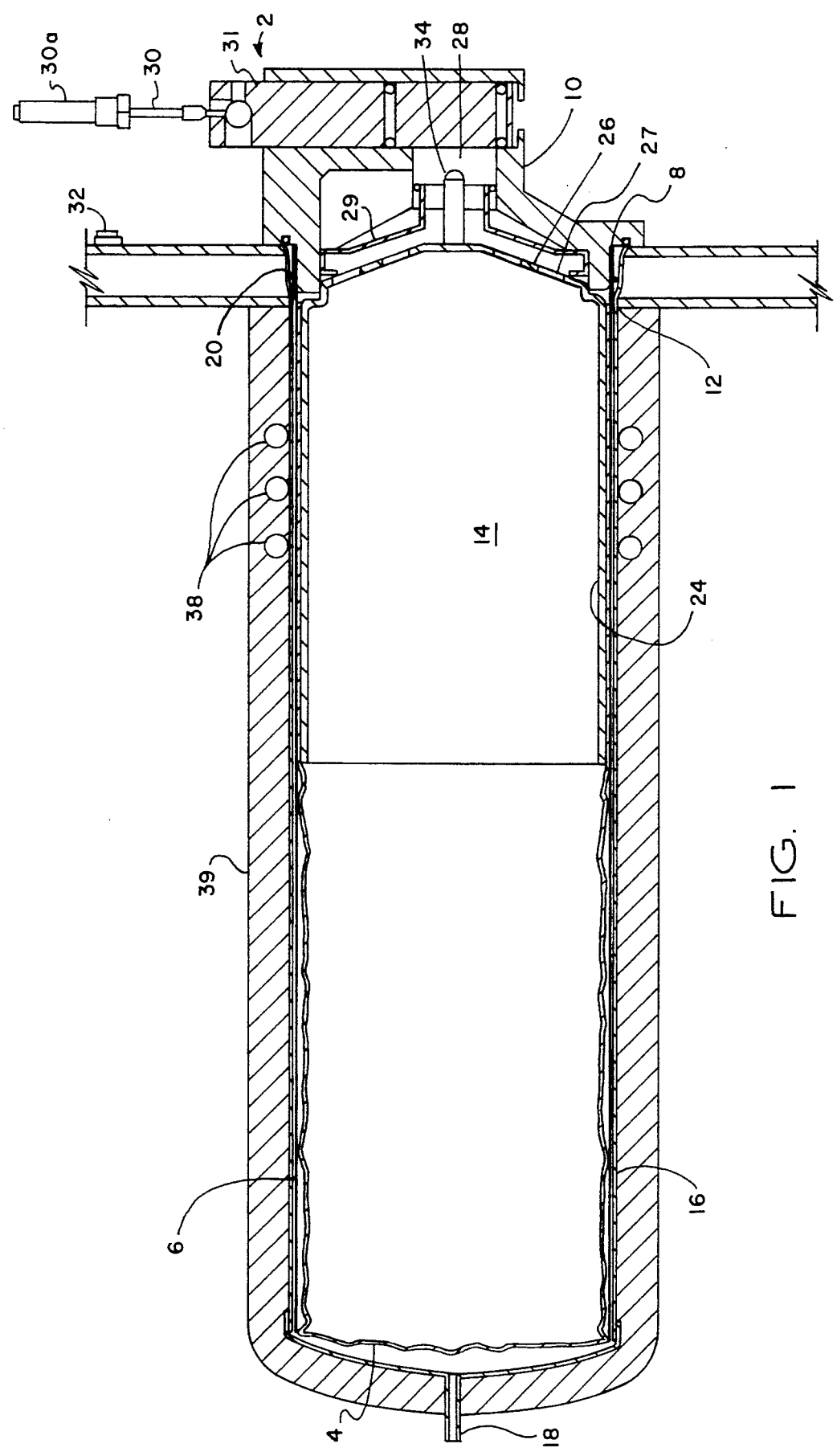
FIG. 1 is a cross-sectional view through the object of the present invention with a filled flexible product bag in place.

FIG. 1 shows the apparatus according to the present invention. The product dispenser 2 contains the product to be dispensed in a flexible bag container 4 constructed for example, of a four millimeter polyethylene which in turn is held in a barrel elongated tube container 6. Tube container 6 is constructed of special helical wound stiff paper material or any other similar thin lightweight supporting material having sufficient stiffness to serve as a tube container. The flexible bag 4 has an open end 8 holding means which is accommodated by folding the open end of the flexible bag back over the end of the tube container 6. The product dispenser 2 has a product release head assembly 10 inclusive of head annular projection 12. The head annular projection 12 projects into the tube assembly past the extrusion head 26. The product barrel elongated tube container 6 assembly fits into the product barrel 16, formed from a rigid thermally conductive material such as steel or aluminum. Product barrel 16 is surrounded by refrigerated cooling tubes 38 whereby there is heat transfer through the walls of barrel 16, container tube 6 and flexible bag 4 to chill food product 14 to at or near its freezing point. The entire barrel 16 is encased in insulation jacket 39 to minimize heat transfer through the walls of barrel 16. The product barrel 16 and tube container 6 is capable of being pressurized with air or other inert gas. The pressurized gas source is supplied through gas source means 18. An O-ring seal 20 presses the tube container 6, the heat sink dispensing tube 24 and tube extrusion head 26 against annular projection 12 forming a gas tight seal. The aluminum or similarly rigid thermal conductive heat sink dispensing tube 24 projects into the product approximately half the length of the elongated tube container 6 and flexible bag 4 when said bag is extended fully, i.e., full of product.

The function of the heat sink dispensing tube 24 is primarily that of a dispensing tube fabricated from appropriate metal or any other material having a high coefficient of thermal conductivity thereby creating a thermal heat sink. Heat entering through the dispensing tube extrusion head 26, insulator cone 29 and dispensing port 28 which might make contact with product being dispensed is rapidly conducted away through the extrusion head projection 34 into the heat sink dispensing tube 24 through the tube extrusion head 26. The heat is dissipated through these combined elements of the heat sink dispensing tube 24 away from the dispensing pathway into the cold chamber i.e., the cold chamber containing food product, near refrigerated cooling tubes 38. An object of the apparatus and methodology of the invention is to prevent softening of the chilled food product in the vicinity of the delivery dispensing head port 28. Another object of the invention is to provide an apparatus for dispensing uniformly chilled product which is mechanically simple and without motor-gear functions.

A second function of the heat sink dispensing tube 24 is to support the flexible bag 4 container preventing premature collapse of the bag 4 and insuring that the flexible bag 4 container collapses in on itself over the rear edge of the heat sink dispensing tube 24 allowing total depletion of the food product from the flexible bag 4 in the barrel elongated tube container 6. The heat sink dispensing tube 24 and tube extrusion head 26 serve a further function in reducing stress on the flexible, i.e. plastic film, bag at or near depletion of the food product by prevention of bursting and rapid release of compressed gas through the openings 27 of the extrusion head 26. The closed end of the heat sink dispensing tube, i.e. the tube extrusion head 26, contains a number of extrusion head openings 27. When the flexible bag 4 is constructed of thin plastic material, the bag, as it empties of the chilled food product, becomes pressed against these extrusion head openings 27 which are sufficiently small to reduce the stress on the plastic to an acceptable value to prevent bursting. Up to one-half inch diameter openings are acceptable to prevent bursting of the plastic bag 4, however multiple openings of small diameter allow adequate food product flow.

The product dispenser 2 assembly consists of a draw valve coupling 30, connected at the top to a pneumatic cylinder 30a, and at the bottom to a product piston valve 31 which moves upwardly to open head dispensing port 28. The draw valve coupling 30 and pneumatic cylinder 30a are actuated by dispensing push button 32. When the dispensing push button 32 is depressed, a pressurized gas source means valve (not shown) introduces gas through gas source means 18 into the product barrel 16 and tube container 6 creating pressure against the flexible bag 4 and contained food product 16. This pressure on the flexible bag 4 and enclosed food product forces food product through the tube extrusion head 26 into the head dispensing port 28 and out through dispensing port 28 which is simultaneously opened by upward movement of product piston valve 31 when push button 32 is depressed and the gas valve are open to pass compressed gas through gas source means 18.

The product release head assembly 10 is readily removed from the product dispenser 2 which allows for removal of the tube container 6 inclusive of the flexible bag 4 and heat sink dispensing tube 24. Cleaning of the product dispenser is rarely required since the food product is contained within a sealed configuration inclusive of the flexible bag 4 and container tube 6 and heat sink dispensing tube 24. The tube extrusion head 26 and head dispensing port 28 and valving mechanism of the product release head assembly 10 are readily subject to cleaning since all cavities are exposable and no moving parts encumber the cleaning and/or operation of the assembly.

Figure 2:
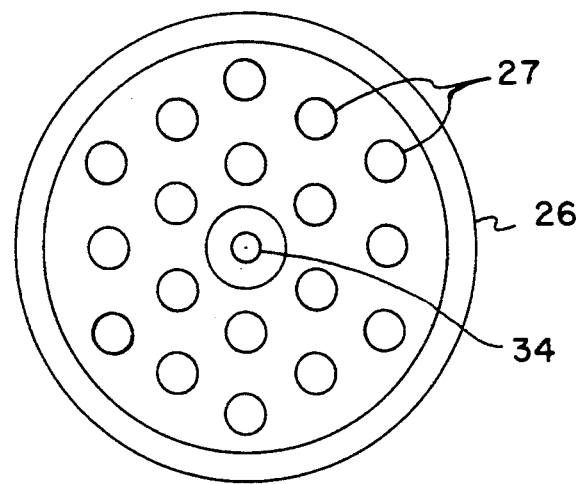
FIG. 2 is a cross-sectional view through the heat sink dispensing tube component of the invention.
Figure 3:
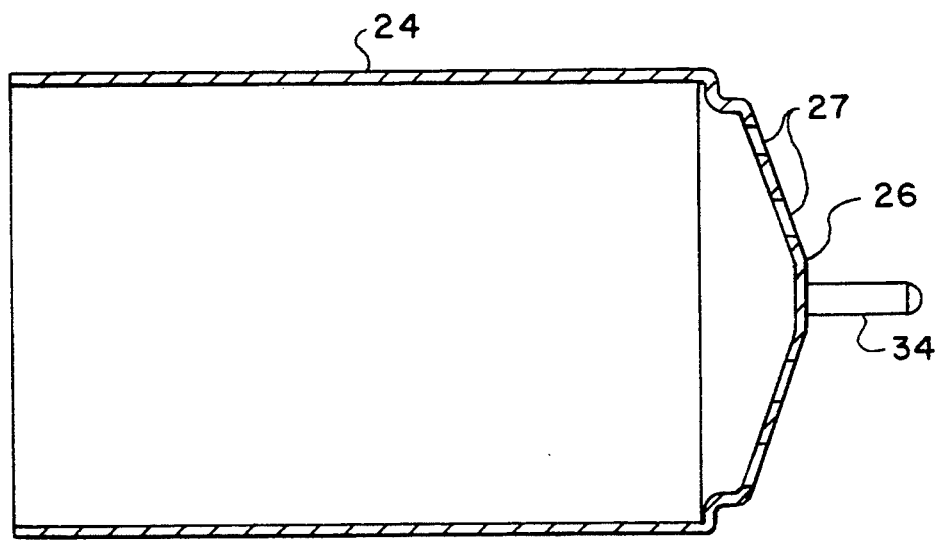
FIG. 3 is an end view of the heat sink dispensing tube inclusive of the dispensing tube extrusion head, extrusion head openings and extrusion head projection.

The heat sink dispensing tube 24 and tube extrusion head 26 inclusive openings 27 are isolated and presented in enlarged view in FIGS. 2 and 3. In addition the extrusion head projection 34 is illustrated in isolation from the extrusion head dispensing port 28.

The product release head assembly inclusive of the piston valve 31 allows for fast installation and ease of cleansing. The draw valve coupling 30 is connected to the piston valve 31 through a ball and socket connection into a keyhole slot arrangement which allows the removal of the draw valve coupling 30 connection from the piston valve 31.

The gas pressure can be supplied by dry air from a piston type compressor via an air storage tank. The air storage tanks can be fabricated from stainless steel or other suitable materials in order to eliminate air contamination. The compressed air generally is released from the barrels prior to removal or installation of the containers. Such compressed air release can be achieved by manual valve means connected to the product barrels.

The design and length of the heat sink dispensing tube 24 has been determined to be about half the length of the tube container 6, however, it can vary from 40 to 60% of the length. The tube container 6 being constructed of a spiral wound cardboard like material requires the reinforcement by the heat sink dispensing tube 24 in order to prohibit collapsing yet allowing the gas pressure to internally collapse the plastic flexible bag 4. If the heat sink dispensing tube 24 is too short, the collapsing plastic flexible bag 4 can create flow blockage. And yet, when the heat sink dispensing tube 24 is too long, the collapsing bag will not turn inside for collapsing and again interfere with the dispensing of a uniformly chilled flowable food product.

The extrusion head opening dimensions and number of openings within the extrusion head will depend upon the viscosity of the chilled food product and/or the nature of the chilled food product, for example, liquid or a liquid suspension of particulate matter. The viscosity of the chilled food product will dictate the amount of open square area in the extruder head thus the size and number of openings, i.e. extrusion head opening 27.

Several product dispensers, up to about 4, can be stored and operated from this machine. Generally, the product barrel is maintained at temperatures of from about −10° to about 0° F. The multiple dispensing barrels can be supplied by one compressor for pressurized air source.

In a typical operation food product 14 is poured into flexible bag 4 which is supported by tube container 6. The open end of flexible bag 4 is temporarily sealed and food product 14 is frozen. The thus frozen food product can be shipped and stored until such time as it is placed in the apparatus of this invention for dispensing as described above. Typical food products that are dispensed include yogurt, ice cream, custard and the like.

The above described apparatus for cooling and dispensing uniformly chilled flowable food products as well as methodology related thereto as discussed above and shown in the Figures, are nonrestrictive embodiments of the invention. Accordingly, the above description should be construed as illustrative, and not in a limiting sense.

We claim:

1. An apparatus for cooling and dispensing uniformly chilled flowable food product through a dispensing tube extrusion head past a thermal conductive extrusion head projection for release of the uniformly chilled flowable food product, comprising:
   a cold barrel encased elongated tubular product container tube container, flexible product bag inside the tube, a dispensing tube, extrusion head and projection and dispensing head port;
   the barrel and elongated tubular product container having a pressurized gas source valve means at a first end and a dispensing tube extrusion head and product release head assembly at a second end;
   the dispensing tube, extrusion head and projection constructed of thermal conductive materials;
   the dispensing tube being inserted into an open end of the bag contained in the elongated tubular container, the dispensing tube and the tubular container sharing a common axis and the dispensing tube substantially filling the inside diameter of the tubular container and extending into the open end of the flexible bag and the contained product up to 40 to 60% of the length of the tubular container with both the tubular container and the dispensing tube defining a cylindrical container for chilled food product contained in the flexible bag, the flexible bag being opened at a second end of the tubular container enclosed at a first end:
   the dispensing tube and tubular container being pressure sealed against a dispensing head by O-ring means;
   said head defining a dispensing passage past the projection and open for release of said product upon opening of valve means; and
   valve means for selectively providing pressurizing gas to the barrel and tubular container chamber through activation of valving means which open the dispensing passage for release of uniformly chilled flowable food product.

2. The apparatus for cooling and dispensing uniformly chilled flowable food product according to claim 1 wherein the flexible product bag is comprised of from three to five mil plastic sheet material.

3. The apparatus for cooling and dispensing uniformly chilled flowable food product according to claim 2 wherein the flexible product bag is comprised of four rail polyethylene or polypropylene.

4. The apparatus for cooling and dispensing uniformly chilled flowable food product according to claim 1 wherein the flexible product bag open end is folded over the tubular product container support tube and held in place by O-ring means.

5. The apparatus for cooling and dispensing uniformly chilled flowable food product according to claim 1 wherein the elongated tubular product support tube is comprised of spiral wound cardboard.

6. The apparatus for cooling and dispensing uniformly chilled flowable food product according to claim 1 wherein the pressurizing gas source is selected from the group consisting of air, nitrogen and carbon dioxide.

7. The apparatus for cooling and dispensing uniformly chilled flowable food product according to claim 1 wherein the extrusion head openings are from about one-quarter to one-half inch in diameter and are circular in shape.

8. The apparatus for cooling and dispensing uniformly chilled flowable food product according to claim 1 wherein the valving means activates the gas pressure means valve.

9. The apparatus for cooling and dispensing uniformly chilled flowable food product according to claim 1 wherein the product barrel is maintained at from about −10° to about 0° F.

10. A method for cooling and dispensing uniformly chilled flowable food product comprising:
   storing the chilled food product within a food dispenser housing enclosed in a cold product barrel;
   pressurizing a first closed end of a flexible bag containing the food product, said bag contained in a cylindrical and elongated tubular product container and having a second open end;
   extruding the chilled food product through an extrusion head mounted on a dispensing tube inserted into the food product through the open end of the bag said extrusion head having an extrusion head projection;

avoiding softening of the chilled flowable food product after extrusion into a dispensing port by means of a heat sink created by the dispensing tube, connected extrusion head and extrusion head projection; and dispensing a uniformly chilled flowable food product.

11. The method according to claim 10 wherein the pressurizing of the product dispenser and extrusion of uniformly chilled food product is achieved by opening the dispensing valve and simultaneously activating electromechanical means for pressurizing the product dispenser and forcing the food material contained in the bag through the extruder.

* * * * *

UNITED STATES PATENT AND TRADEMARK OFFICE
CERTIFICATE OF CORRECTION

PATENT NO. : 5,361,941
DATED : November 8, 1994
INVENTOR(S) : Shafi Parekh; Bernard M. Geiger; Reginald Fowler It is certified that error appears in the above-identified patent and that said Letters Patent is hereby corrected as shown below:

Column 6, line 29, "rail" should read -- mil --

Signed and Sealed this

Twenty-first Day of February, 1995

Attest:

BRUCE LEHMAN

*Attesting Officer*    *Commissioner of Patents and Trademarks*